United States Patent [19]

Gustafson

[11] Patent Number: 4,527,548
[45] Date of Patent: Jul. 9, 1985

[54] WINDOW BLIND TYPE SOLAR COLLECTOR

[76] Inventor: Gary R. Gustafson, 700 W. 46th St., Minneapolis, Minn. 55409

[21] Appl. No.: 578,743

[22] Filed: Feb. 9, 1984

[51] Int. Cl.[3] .............................................. F24J 3/02
[52] U.S. Cl. .................................. 126/448; 126/428; 126/431; 237/56
[58] Field of Search ............... 126/448, 432, 444, 428, 126/429, 431; 237/56; 160/166 R, 149

[56] References Cited

U.S. PATENT DOCUMENTS

| | | | |
|---|---|---|---|
| 4,014,313 | 3/1977 | Pedersen | 126/446 |
| 4,143,640 | 3/1979 | Pierce | 126/438 X |
| 4,144,931 | 3/1979 | Medico, Jr. | 126/446 X |
| 4,232,731 | 11/1980 | Kaplow et al. | 126/430 X |
| 4,284,069 | 8/1981 | Hörster et al. | 126/446 |

Primary Examiner—Larry Jones
Attorney, Agent, or Firm—Williamson, Bains, Moore & Hansen

[57] ABSTRACT

A solar collector is designed for use in the window opening of a house and also serves to retain the window function for the occupants of the house. The collector has a rectangular frame having an inner pane of glass, an outer pane or panes and a plurality of rotatable louvers mounted in the frame between the inner and outer panes. The louvers have a reflective material on one side and a dark or solar absorbing surface on the other, thereby allowing the proper side to be rotated into position depending on the season. A heated chamber is provided within the louvers so that the working fluid may flow directly through the louvers and allow the heat transfer to occur therein.

3 Claims, 6 Drawing Figures

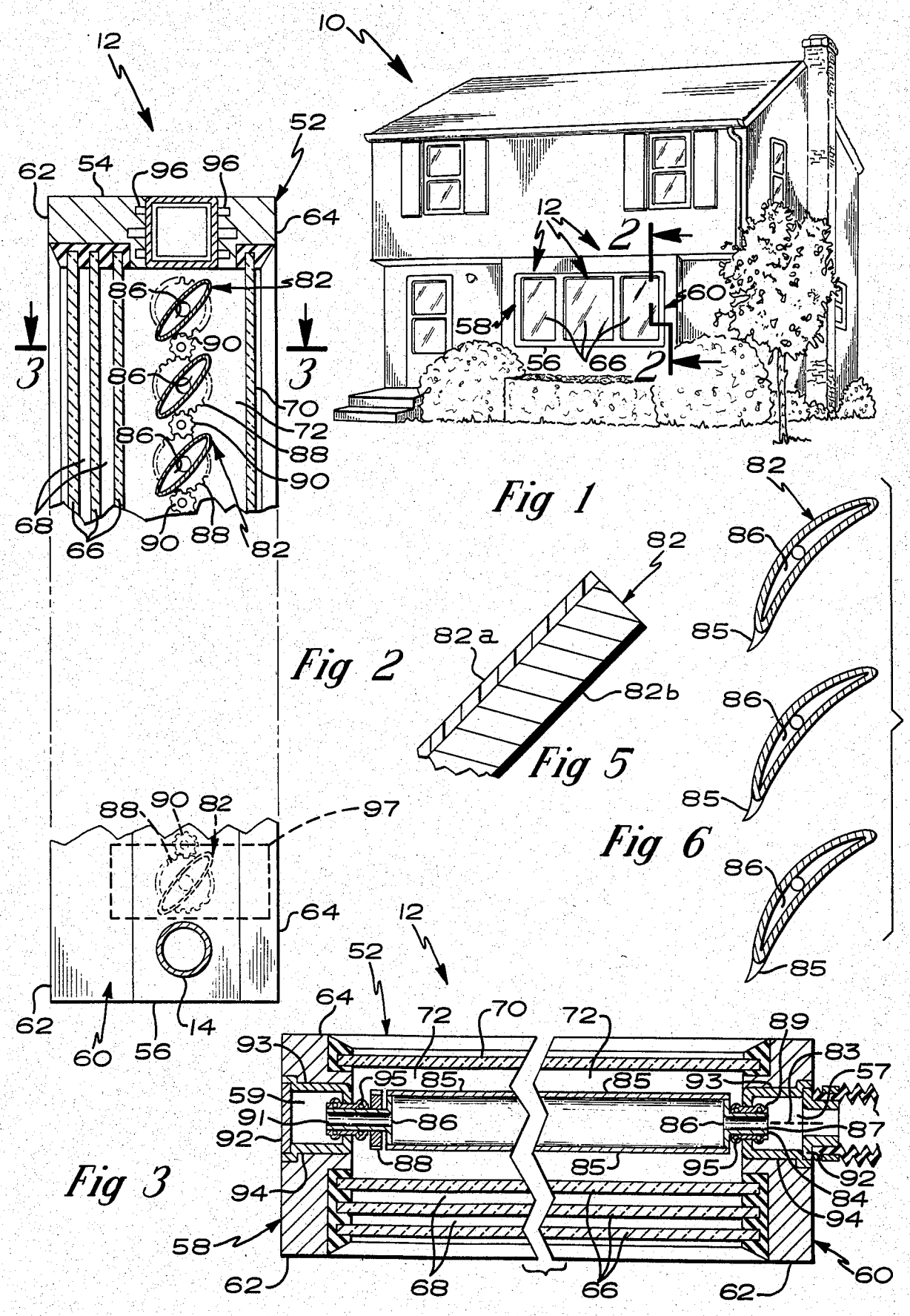

WINDOW BLIND TYPE SOLAR COLLECTOR

BACKGROUND OF THE INVENTION

In the search for new sources of energy, much attention has been lavished on the use of solar power and, in particular, upon various types of solar collectors which serve to heat a fluid which is in turn either utilized directly or used to heat the living space in a home or other stucture. In particular, it is well established in the art to utilize a window or window opening as a solar collector as shown in U.S. Pat. Nos. 3,955,555; 3,903,665; 2,595,905; 3,107,052 and 4,301,787. U.S. Pat. No. 2,595,905 also utilizes a venetian-blind type of apparatus to cover and uncover the solar cell.

U.S. Pat. No. 4,301,787 to Rice discloses a solar heat collector which is placed across an open window area for selectively heating the interior of a dwelling place or the like. The collector includes a plurality of fins transversely disposed across the window area. Means are provided for reversing the orientation of the fins between a heat absorbing and heat reflective disposition. In such a venetian blind system, heat is generated within an insulating chamber when the sun's rays impinge on the fins. Heat loss is a problem in such systems as the heat must be transferred from the fins to the air carried through the interior chamber. It is therefore desirable to provide a solar collector having the working fluid or media passing directly through its louver or fin to thereby maximize heat retention.

It is, therefore, an object of this invention to provide a device which provides improved efficiency and utility over the above-mentioned prior art devices and which may be easily and inexpensively manufactured.

SUMMARY OF THE INVENTION

A frame is provided having a top, a bottom, and first and second sides. A plurality of adjacent, generally parallel, rotatable louvers are mounted between the two sides and extend horizontally across from one side to the other. Each louver has a gear located at one end thereof, and the gears of adjacent louvers are spaced apart from one another with an idler gear positioned therebetween such that when one louver is rotated, the remaining louvers will follow in synchronous fashion with the planes of the louvers remaining parallel at all times. Each louver is essentially eliptical and has a first surface which is heat and light absorbing and a second surface which is heat and light reflective. Lips extending along the base of one embodiment of the louvers provide privacy when the louvers are in a closed position and at the same time permit the louvers to rotate 360 degrees.

Each of the louvers has a heating chamber which receives the working fluid and allows the heat transfer to occur therein. A plurality of fluid inlet manifolds are located along the second side adjacent to the inlet end opening of each of the louvers. The fluid inlet manifolds are arranged at spaced apart intervals and provide for a means for directing the working fluid into the heating chamber of the louvers. A similar manifold is located along the first side of the frame adjacent to the outlet end of each of the louvers which provides for the outlet of fluid from the collector.

A pane of glass or the like is mounted on the inside of the frame and one or more panes may be mounted on the outer side of the frame, thereby forming a compartment for heat accumulation. The louvers are arranged within the compartment between the inside and outside panes to receive the sunlight energy.

A swingably mounted hinge is located along the frame adjacent either the inside panes or outside panes. The hinge allows the frame to be swung open so that the panes of glass may be cleaned.

A control mechanism may be provided for positioning the louvers. This may range from a simple manual handle for cranking the louvers into the proper orientation to an electrical motor mechanically coupled to rotate the louvers. Further, a control system may be utilized which maximizes the solar exposure of the louvers and thence the heat collecting capacity of the collector by maintaining the louvers at as close to perpendicular to the sun's rays as is possible.

While it is contemplated that a highly viscous fluid will be used as the heat transfer and collecting fluid in the instant invention, any other heat transfer media may be utilized such as water, air or other gases or liquids.

The use of the louvers provides an efficient solar collection device while allowing retention of the window function so that occupants of a building may still view the outside.

These and other objects and advantages of the invention will become readily apparent as the following description is read in conjunction with the accompanying drawings wherein like reference numerals are used to refer to the views.

BRIEF DESCRIPIION OF THE DRAWINGS

FIG. 1 is a perspective view showing the instant invention installed in a building.

FIG. 2 is a sectional view taken along lines 2—2 of FIG. 1.

FIG. 3 is a sectional view taken along lines 3—3 of FIG. 2.

FIG. 5 is an enlarged cross-sectional view of one of the louvers.

FIG. 6 is a side sectional view of one embodiment of the louvers.

DESCRIPTION OF THE PREFERRED EMBODIMENT

Figure 4:
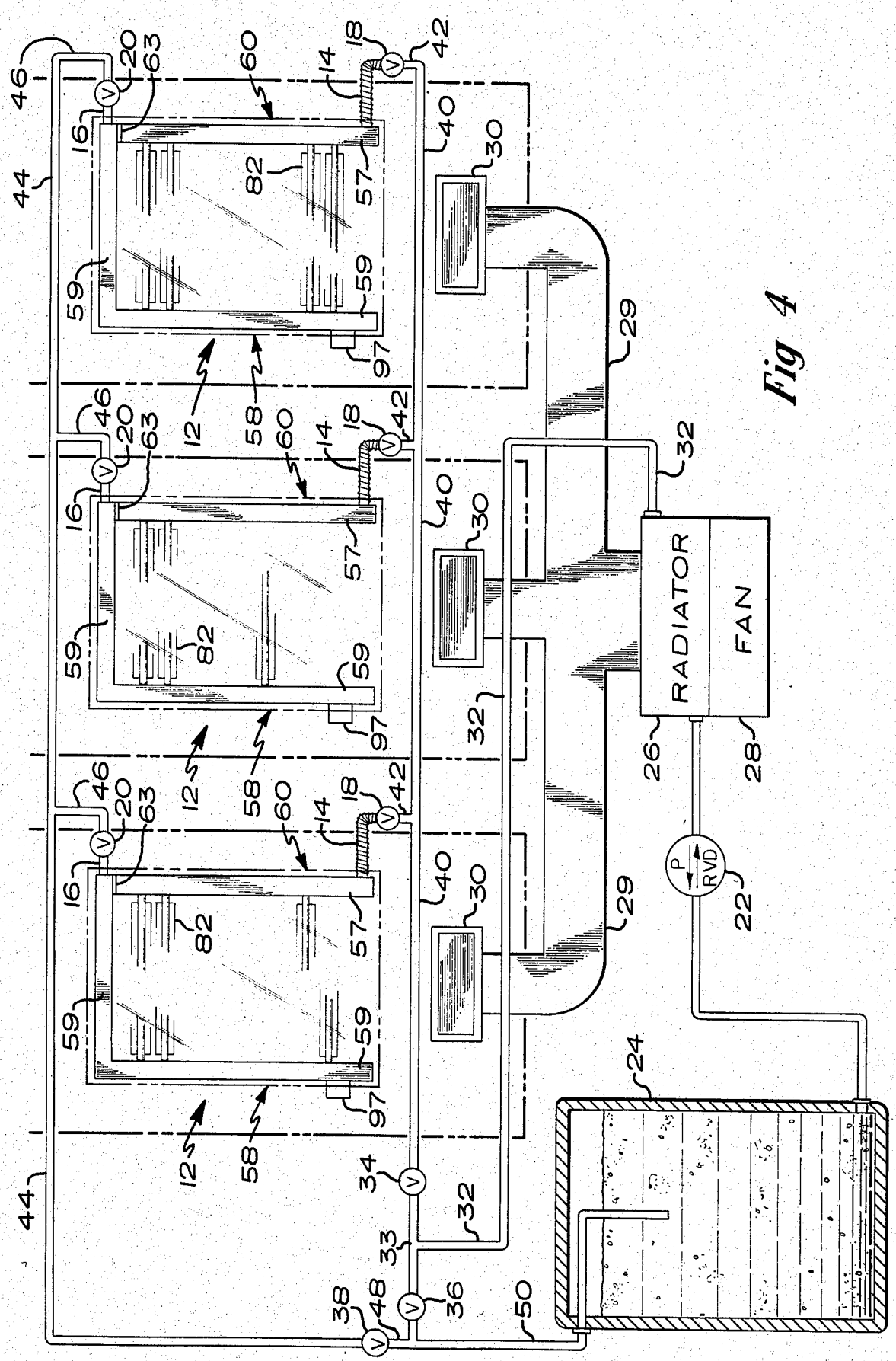
FIG. 4 is a system schematic showing the invention as applied to a building heating system.

Referring now to FIG. 1, shown therein is a house 10 having a plurality of solar collectors 12 installed therein in the normal window openings. While the use of such collectors will generally be provided on the southern exposure of a house so that they receive maximum solar exposure, of course, they may be incorporated into any other side of a building which has at least some solar exposure.

Turning to FIG. 4, shown therein is the instant invention installed in a typical solar heating system. Each collector 12 has an inlet 14 and an outlet 16. Collector inlets 14 are in turn connected to inlet isolation valves 18 while collector outlets 16 are connected to outlet isolation valve 20. The collector inlets 14 are preferably a flexible connector, as shown in FIG. 4. The provision of such isolation valves 18 and 20 allows any individual collector 12 to be removed from communication with the system in the event of breakage, repair, or should one window become shaded and therefore not able to heat the system fluid. While the system is preferably operated with a highly viscous fluid as the working fluid, it can be appreciated that any other fluid, liquid or gas may be used in the inventive system.

Hot water is drawn from a reservoir 24 by means of a reversible pump 22 and pumped through a radiator 26. A fan 28 blows air to be heated through radiator 26 and thence through duct work 29 to hot air registers 30 for distribution in the building for heating purposes. After passing through radiator 26, the working fluid runs through line 32 to T-junction 33. Attached at either side of T-junction 33 are valves 34 and 36. On the outlet side of valve 34 is inlet supply line 40 which has a plurality of inlet runners 42 extending therefrom and attaching to inlet isolation valves 18. Similarly, outlet supply line 44 is connected to a plurality of outlet runners 46 which in turn are connected to outlet isolation valves 20. Outlet supply line 44 in turn connects with valve 38. Outlet supply line 44 in turn connects with valve 38. T-junction 48 is connected to valves 36 and 38 as well as reservoir inlet 50.

In normal operation during the daytime, that is when collectors 12 are used to heat the system, valve 36 is closed and valves 34 and 38 are open. Assuming that all collectors are operable and in good order, all isolation valves 18 and 20 are opened. The working fluid is then pumped out of reservoir 24 through pump 22 and into radiator 26. The working fluid then passes through line 32 and into inlet supply line 40 whereupon it enters collectors 12 through inlet supply runners 42, isolation valves 18 and collector inlets 14. After passing through the collector, as will be described more fully hereinafter, the working fluid exits collectors 12 through outlets 16, isolation valve 20 and outlet runners 46. The working fluid then passes through outlet supply line 44 through valve 38 and back into reservoir 24 through reservoir inlet 50.

At night, or when for other reasons collectors 12 are not operative and it is desired to warm the house, valves 34 and 38 are closed and valve 36 is opened, thereby allowing an abbreviated cycle as described above utilizing the stored heat of the fluid present in reservoir 24.

Turning to FIGS. 2 and 3, the collector 12 is comprised generally of a frame 52 having a top 54, a bottom 56 and first and second sides, 58 and 60 respectively. Frame 52 has an outer edge 62 and an inner edge 64. Mounted in frame 52 adjacent outward edge 62 are three panes 66 of glass or other similar transparent material. Outer panes 66 are spaced apart to form insulating chambers 68 therebetween. While three outer panes 66 are shown in the preferred embodiment, it can be appreciated that a smaller or larger number of outer panes 66 could be provided as desired. An inner pane 70 is mounted adjacent the inner edge 64 of frame 52 and is also formed of a similar material to panes 66. Inner pane 70 is spaced from the innermost outer pane 66 to form a chamber 72 in which a plurality of louvers 82 are mounted.

A plurality of adjacent louvers 82 are mounted between the first 58 and second 60 sides of frame 52 for rotation about their longitudinal axes 83 with the axes 83 of the adjacent louvers 82 being substantially parallel and lying in a common plane. This mounting is shown most particularly in FIGS. 2 and 3. Each louver 82 is of relatively eliptical design having a receiving chamber 86 therein and also having a reflective side 82a and an absorbing side 82b, the operation of which will be more fully explained hereinafter. Each louver 82 has located on either end a cylindrical shaft 84 which rotates about axis 83 in bushing 89 which is in turn mounted adjacent one of the sides 58 or 60. A louver gear 88 is located on one end of each louver 82, coaxial with the shaft 84. A plurality of idler gears 90 are also rotatably mounted on first side 58 and are engaged with the adjacent louver gears 88 as shown in FIG. 2, the idler gears 90 having their central axis parallel to and coplanar with the axes 83. The use of idler gears 90 allows louvers 82 to be rotated synchronously by means of one control. It can be appreciated, of course, that while FIGS. 2 and 3 show a gear train made up of louver gears 88 and idler gears 90 on only the first side 58 of the device, a second gear train may be provided adjacent the second side 60 if so desired.

Louvers 82 shown in FIG. 2 are of a width slightly greater than the spacing between adjacent shafts 84 and thus, the louvers 82 are not capable of complete rotation through 360 degrees.

An alternate embodiment of the louvers 82 is shown in FIG. 6 wherein each louver includes a lip 85 which extends outwardly therefrom along the entire length of the louver 82. The lips 85 are preferably in the form of concave-convex extensions of the louvers 82. The lips 85 cover the adjacent louvers 82 for privacy when the louvers 82 are aligned in a generally vertical closed arrangement. The design of the lips 85 permits the louvers 82 to be rotated 360° and provides for increased reflecting and absorption characteristics as the louvers can be arranged generally normal to the incoming sunlight rays.

The heating chamber 86 of each of the louvers 82 permits the working fluid to flow within the louver 82. The heating chamber 86, as shown in FIGS. 2 and 6, comprises the entire interior section of louvers 82. However, the heating chamber 86 may also only comprise a portion of the interior section of the louvers 82. In the receiving chamber 86, heat transfer occurs as the sunlight energy is absorbed by the absorbing surface 82b of the louvers 82 and such absorbed sunlight energy is transferred to the working fluid which is being transported within the heating chanber 86. Since the working fluid is flowing directly through the heating chamber 86 within the louvers 82, heat dissipation is minimized.

The frame 52 also includes an inlet fluid manifold 57 and an outlet fluid manifold 59 located adjacent the second and first sides 58 and 60, respectively. The inlet fluid manifold 57 receives the working fluid from the inlet or flexible connector 14 as illustrated in FIG. 4. The louvers 82 include an inlet end opening 87 and an exit end opening 91. The working fluid flows upwardly by convection through the inlet manifold 57 and is distributed into a plurality of inlet end openings 87 which are preferably evenly spaced within the inlet manifold 57 so that a more equal distribution of the working fluid will result. A pump may also be used for increased flow to guide the working fluid upwardly through the inlet manifold 57. As shown in FIG. 4, the inlet manifold 57 includes a barrier 63 along its upper extremities so that the working fluid cannot escape the collector through outlet 16. The barrier 63 also insures that all of the working fluid will flow through an inlet end opening 87. The inlet end openings 87 are an extension of the heating chamber 86 within the louvers 82 so that working fluid entering inlet end openings 87 from the inlet manifold 57 will directly enter the heating chamber 86. The heated working fluid exits the heating chamber 86 through exit end openings 91 and flows upwardly by convection through the outlet manifold 59 for subsequent discharge through outlet 16. The outlet manifold 59 may also include a pump which would increase the flow of the working fluid within the outlet manifold 59. The appearance and construction of inlet and outlet manifolds 57 and 59 are substantially similar. As shown in FIG. 4, the working fluid enters and exits the solar collector 12 along the same side.

As shown in FIG. 3, the collectors 12 include heat seal 92 engaging flanges 93 and 94 adjacent the inlet end openings 87 and exit end openings 91 and provide for a means for heat sealing the heating chamber 86. The flanges 93 and 94 engage the bushings 89 of the shaft 84 thereby providing a fluid-tight inlet end opening 87 along the inlet manifold 57 and a fluid-tight opening 91 along the outlet manifold 59. O-rings 95 are provided which engage the shaft 84 to further heat seal the heating chamber 86 from the inlet and outlet manifolds 57 and 59 respectively. The flanges 93 and 94 are preferably made of a teflon or teflon-like material.

A swingably mounted hinge 96 is provided along the frame 52 either adjacent the first pane of glass 66 or the second pane of glass 70. The hinge 96 permits the frame 52 to be swung to an open position so that either panes of glass 66 or 70 may be cleaned easily.

A control mechanism 97 as shown in FIGS. 2 and 4 provides for a means for rotating said louvers and maintaining said louvers 82 parallel to one another. Control mechanism 97 may range anywhere from a simple crank handle for manual operation to a simple electrical motor for positioning of more than one unit at once to a device which utilizes simple control circuitry to maximize the solar incidence upon each louver 82.

When it is desired to operate the system, the working fluid is circulated through the collector 12 as described above. Louvers 82 are rotated such that light and heat absorbing surface 82b is presented toward the outer edge 62 of collector 12 and ideally positioned so that the louvers 82 are perpendicular to the sun's incident rays. In the summer months or any other time when heating of the fluid is not desired, louvers 82 may be rotated so that reflective surface 82a is presented outwardly thus reflecting the sun's rays back toward the outside. Of course, in any position other than when louvers 82 are vertical as seen in FIG. 2, occupants of the house will be able to utilize the collector 12 as a conventional viewing window.

While the preferred embodiments of the present invention have been described, it should be understood that various changes, adaptions and modifications may be made therein without departing from the spirit of the invention and the scope of the appended claims.

What is claimed is:

1. A window blind type solar collector for mounting and use as a window and usable with a working fluid as the heat transfer source, comprising:
    a frame having a top and bottom and first and second sides, said frame including outlet and inlet manifolds along said first and second sides, respectively, through which the working fluid may flow during operation;
    a first pane of transparent material mounted in said frame;
    a second pane of transparent material mounted in said frame, parallel to said first pane and spaced from said first pane; and
    a plurality of louvers rotatably mounted between said first and second sides of said frame, each said louver including:
        first and second ends positioned closely adjacent said first and second sides of said frame, each louver including a pair of substantially parallel, spaced apart edges extending between said first and second ends and each louver further including upper and lower sides with each louver side extending continuously in fluid tight relationship between said ends and said edges to define a louver wall;
        an inlet opening at said first end of said louver and an outlet opening at said second end of said louver;
        each of said inlet and outlet openings being of a predetermined cross sectional area;
        each said louver including an interior working fluid channel permitting the working fluid to have direct contact with said louver wall within said channel while flowing through said channel, said channel communicating with said inlet and outlet openings and said channel extending between said first and second ends and between said spaced apart edges and said upper and lower sides with said working fluid channel having a substantially larger cross sectional area than said cross sectional area of said inlet and outlet openings so the said channel fills each said louver to significantly increase heat transfer thereto;
        said inlet and outlet openings connected to communicate with said inlet and outlet manifolds, respectively; and
    means for rotating said plurality of louvers and interior working fluid channels in unison through at least 360° and maintaining said louvers substantially parallel to one another including:
        a gear attached to each of said louvers adjacent said frame first sides; and
        a plurality of idler gears rotatably mounted to said frame first sides, each of said idler gears being located between and engaged with two adjacent louver gears.

2. The solar collector of claim 1 and further including rotation accommodating sealing means between said inlet manifold and said inlet and between said outlet mainfold and said outlet to seal the working fluid while permitting rotation of said louver relative to said manifold.

3. The solar collector of claim 2 wherein each of said louvers also includes an elongated, resiliently bendable lip fixed to and extending from one of said louver edges and overlappping an edge of an adjacent rotatable louvers during rotation of said louvers to close any space between adjacent louvers while resiliently bending to permit continuous rotation of said louvers.

* * * * *